United States Patent
Kawase (10) Patent No.: US 6,877,444 B2
(45) Date of Patent: Apr. 12, 2005

(54) INTERMITTENT FLOW TYPE THERMAL DECOMPOSER

(75) Inventor: Koichi Kawase, Kasama (JP)

(73) Assignees: Art Ceramic Co., Ltd. (JP); E.T.I. Co., Ltd. (JP)

(*) Notice: Subject to any disclaimer, the term of this patent is extended or adjusted under 35 U.S.C. 154(b) by 0 days.

(21) Appl. No.: 10/474,835

(22) PCT Filed: May 22, 2001

(86) PCT No.: PCT/JP01/04278
§ 371 (c)(1),
(2), (4) Date: Oct. 15, 2003

(87) PCT Pub. No.: WO02/094463
PCT Pub. Date: Nov. 28, 2002

(65) Prior Publication Data
US 2004/0118327 A1 Jun. 24, 2004

(51) Int. Cl.[7] ................................................ F23G 5/02
(52) U.S. Cl. ................. 110/229; 110/246; 110/242
(58) Field of Search ........................ 110/229, 226, 110/218, 242, 246, 250

(56) References Cited

U.S. PATENT DOCUMENTS

| | | | | |
|---|---|---|---|---|
| 3,736,887 A | * | 6/1973 | Wiedermann | 110/246 |
| 4,361,100 A | * | 11/1982 | Hinger | 110/238 |
| 4,544,374 A | * | 10/1985 | Mallek et al. | 48/111 |
| 4,667,609 A | * | 5/1987 | Hardison et al. | 588/227 |
| 4,840,129 A | * | 6/1989 | Jelinek | 110/229 |
| 5,769,007 A | * | 6/1998 | Tratz et al. | 110/246 |
| 5,904,105 A | * | 5/1999 | Pappinen | 110/226 |
| 6,213,030 B1 | * | 4/2001 | Robertson et al. | 110/246 |

FOREIGN PATENT DOCUMENTS

| | | |
|---|---|---|
| JP | 49-15693 | 2/1974 |
| JP | 6-218353 | 8/1994 |
| JP | 7-155731 | 6/1995 |
| JP | 10-85703 | 4/1998 |
| JP | 11-263977 | 9/1999 |
| JP | 2001-162256 | 6/2001 |

* cited by examiner

Primary Examiner—Kenneth Rinehart
(74) Attorney, Agent, or Firm—Lorusso, Loud & Kelly

(57) ABSTRACT

A thermal decomposition system is disclosed which can decompose wastes thermally in a continuous manner and which is therefore superior in its working efficiency. In the thermal decomposition system, wherein wastes to be treated are charged into a crucible and the crucible is heated while holding the interior thereof in vacuum to decompose the wastes thermally, both ends of a rotary furnace are supported rotatably by a frame, and drive units for rotating the rotary furnace are provided. The crucible, which is cylindrical, is installed in a central axis direction of the rotary furnace and a spiral groove is formed axially in an inner wall of the crucible. A heating device for heating the interior of the crucible is installed within the rotary furnace. Both opening ends of the crucible are connected to a feed box and a discharge box, respectively, which are supported by the frame. Shutter devices are installed in the feed box and the discharge box, respectively, to shut off the interior of the crucible from the exterior. The discharge box is connected to a suction device which evacuates the interior of the crucible and which causes gases produced during decomposition of the wastes to be discharged from the crucible by suction.

18 Claims, 9 Drawing Sheets

INTERMITTENT FLOW TYPE THERMAL DECOMPOSER

BACKGROUND OF THE INVENTION

1. Field of the Invention

The present invention relates to a thermal decomposition system for thermally decomposing ash discharged from incinerators, sludge, and wastes discharged from companies' facilities, etc. Particularly, the invention is concerned with a thermal decomposition system capable of thermally decomposing even such industrial wastes as rubber and plastic products which produce poisonous gases during incineration.

2. Description of the Prior Art

Wastes discharged from homes and companies' facilities have heretofore been classified mainly into combustible refuses capable of being incinerated, incombustible refuses incapable of being incinerated because of issuing of poisonous gases upon incineration, such as rubber and plastic products, resource refuses capable of being recycled such as paper, glass and aluminum products, and industrial wastes such as waste oils, concrete and metallic structures discharged from factories and facilities. These refuses and wastes are subjected to respective appropriate treatments and disposals.

Generally, combustible refuses are subjected to incineration, while incombustible refuse is buried in landfill spaces. As to resource refuses, they are classified according to the materials of paper, glass, aluminum, etc. and the thus-classified materials are subjected to crushing or melting for recycling. Further, industrial wastes are subjected to respective appropriate special processings.

However, as to some wastes, incineration is not accepted as is the case with rubber and plastic products even if they are combustible. Besides, those wastes issue smokes and gases due to, for example, incomplete combustion during incineration, exerting a bad influence on the environment. Moreover, in the conventional incinerators, wastes are incinerated by burning in air, so if a chlorine-containing waste is mixed therein, dioxin and chlorine compounds will be produced, thus giving rise to the problem that a bad influence is exerted on the environment.

Further, since ash from incineration and incombustible refuses incapable of being subjected to incineration are buried in landfill spaces, etc., it is necessary to ensure landfill spaces. Besides, offensive smells emitted from wastes and heavy metals contained in wastes exert a bad influence on the environment which surrounds the landfill space concerned.

The applicant in the present case has developed a thermal decomposition system wherein wastes to be treated are put into a hermetically sealed crucible, then the interior of the crucible is made vacuous and heating is conducted to thermally decompose the wastes, and obtained a patent for that system (Japanese Patent Publication No. 34902/95, U.S. Pat. No. 2,038,214).

In the said thermal decomposition system, a crucible which contains wastes to be incinerated is supported within a furnace body so as to give a clearance between an inner wall of the furnace body and an outer wall of the crucible except the supported portion of the crucible, a heating device for heating the crucible is mounted in the clearance between the inner wall of the furnace body and the outer wall of the crucible, an opening of the crucible is positioned inside an opening of the furnace body, an opening/closing lid for closing those openings at a time and a suction pipe for discharging gases produced during incineration of the materials to be treated from the interior of the crucible are provided, and further provided are a suction device connected to the suction pipe and a gas sorting/extracting device connected to the suction device. The interior of the crucible is closed with the opening/closing lid and is made vacuous, then in this vacuous state the wastes to be treated present in the interior of the crucible are heated, and gases produced from the wastes are withdrawn from the crucible by the suction device and are extracted by the gas sorting/extracting device.

However, according to the system being considered, wastes to be treated can be charged into the crucible only in a predetermined certain quantity, so the work comprising sealing the crucible interior hermetically, making it vacuous, heating, and withdrawal after the heating for a certain time, must be repeated for each predetermined quantity of wastes. Therefore, in the case where the volume of wastes to be treated is large, it is necessary that a series of operations be repeated many times, and thus much time and labor are required.

SUMMARY OF THE INVENTION

The present invention has been accomplished in view of the above-mentioned point and it is an object of the invention to provide a thermal decomposition device capable of thermally decomposing a large volume of wastes in a continuous manner and thereby enhancing the working efficiency.

In the first aspect of the present invention there is provided an intermittent flow type thermal decomposition system for thermally decomposing wastes in the interior of a crucible while the interior of the crucible is held in vacuum, comprising the crucible which is formed in a cylindrical shape having an inlet and an outlet at both ends thereof and having a spiral groove formed in an inner wall thereof, a frame, a rotary furnace held rotatably by the frame, with the crucible being installed in the interior of the rotary furnace, a heating device disposed inside the rotary furnace and outside the crucible, a drive unit for rotating the rotary furnace, a feed box communicating with the inlet of the crucible and supported by the frame, a discharge box communicating with the outlet of the crucible and supported by the frame, a shutter device installed in said feed box for disconnecting said interior of the crucible from the exterior, a shutter device installed in said discharge box for disconnecting said interior of the crucible from the exterior, and a suction device connected with the discharge box to evacuate the interior of the crucible and discharge gases from the interior of the crucible by suction, the gases being produced when the wastes are decomposed thermally by the heating device.

In the second aspect of the present invention there is provided, in combination with the above first aspect, an intermittent flow type thermal decomposition system wherein a gas sorting/extracting device is connected to the suction device to sort and extract gasses produced during decomposition of the wastes. In the third aspect of the present invention there is provided, in combination with the above second aspect, an intermittent flow type thermal decomposition system wherein a heat treatment equipment is connected to the gas sorting/extracting device and a gas, if any, not extracted by the gas sorting/extracting device out of the gases produced during decomposition of the wastes is introduced into the said heat treatment equipment. In the fourth aspect of the present invention there is provided, in combination with the above first aspect, an intermittent flow type thermal decomposition system wherein the outlet of the crucible is positioned higher than the inlet of the crucible. In the fifth aspect of the present invention there is provided, in combination with the above first aspect, an intermittent flow type thermal decomposition system wherein the frame is mounted onto a base in a swingable relation to each other so that a tilt angle of the frame relative to the base can be changed freely. In the sixth aspect of the present invention there is provided, in combination with the above first aspect, an intermittent flow type thermal decomposition system wherein the shutter devices for shutting off the interior and exterior of the crucible from each other have each a double shut-off structure. In the seventh aspect of the present invention there is provided, in combination with the above first aspect, an intermittent flow type thermal decomposition system wherein the heating device is a far infrared radiation heating device capable of heating the wastes in the crucible to a temperature of not lower than 1200° C. In the eighth aspect of the present invention there is provided, in combination with the above first aspect, an intermittent flow type thermal decomposition system wherein a ring-like conductor is provided on an outer wall of the rotary furnace, the said conductor and the heating device disposed in the interior of the rotary furnace are connected with each other electrically, and a contact piece adapted to contact the ring-like conductor constantly during rotation of the rotary furnace is provided in the frame.

DETAILED DESCRIPTION OF PREFERRED EMBODIMENTS

Embodiments of the present invention will be described hereunder with reference to the accompanying drawings.

A frame 2 is supported on a base 1 through a horizontal shaft 1a, and both ends of a cylindrical rotary furnace 3 are supported rotatably by the frame 2. The reason why the frame 2 is supported centrally of the base 1 through the horizontal shaft 1a is that the rotary furnace 3 is to be tilted to discharge wastes automatically from the interior of a crucible which will be described later. Stationary discs 4 are fixed respectively to both ends of the frame 2. The stationary discs 4 are opposed respectively to rotary discs 3a provided at both ends of the rotary furnace 3 in a rotatable state through bearings 4a. The stationary discs 4 and the rotary discs 3a are attracted to each other magnetically. Centrally of each rotary disc 3a is formed a through hole 3b, while centrally of each stationary disc 4 is formed a through hole 4b.

On both sides of the frame 2 and at lower positions there are provided a plurality of rollers 5 in contact with an outer wall of the rotary furnace 3 on both sides and at lower positions of the furnace. The rollers 5 are rotated by drive units 5a respectively, thereby causing the rotary furnace 3 to rotate. To one stationary disc 4 is fixed a chamber-like feed box 6, while to the other stationary disc 4 is fixed a chamber-like discharge box 7. Feed hoppers 8 for the feed of wastes to be treated are installed on top of the feed box 6 and a rotary shutter 9 as a first shutter device is disposed in lower portions of the feed hoppers 8 (an upper portion of the feed box 6). Further, an auto-shutter 10 as a second shutter device is disposed within the feed box 6. Also within the discharge box 7 is disposed an auto-shutter 11 as a first shutter device, and a rotary shutter 12 as a second shutter device is disposed in a lower portion within the discharge box 7.

Figure 3:
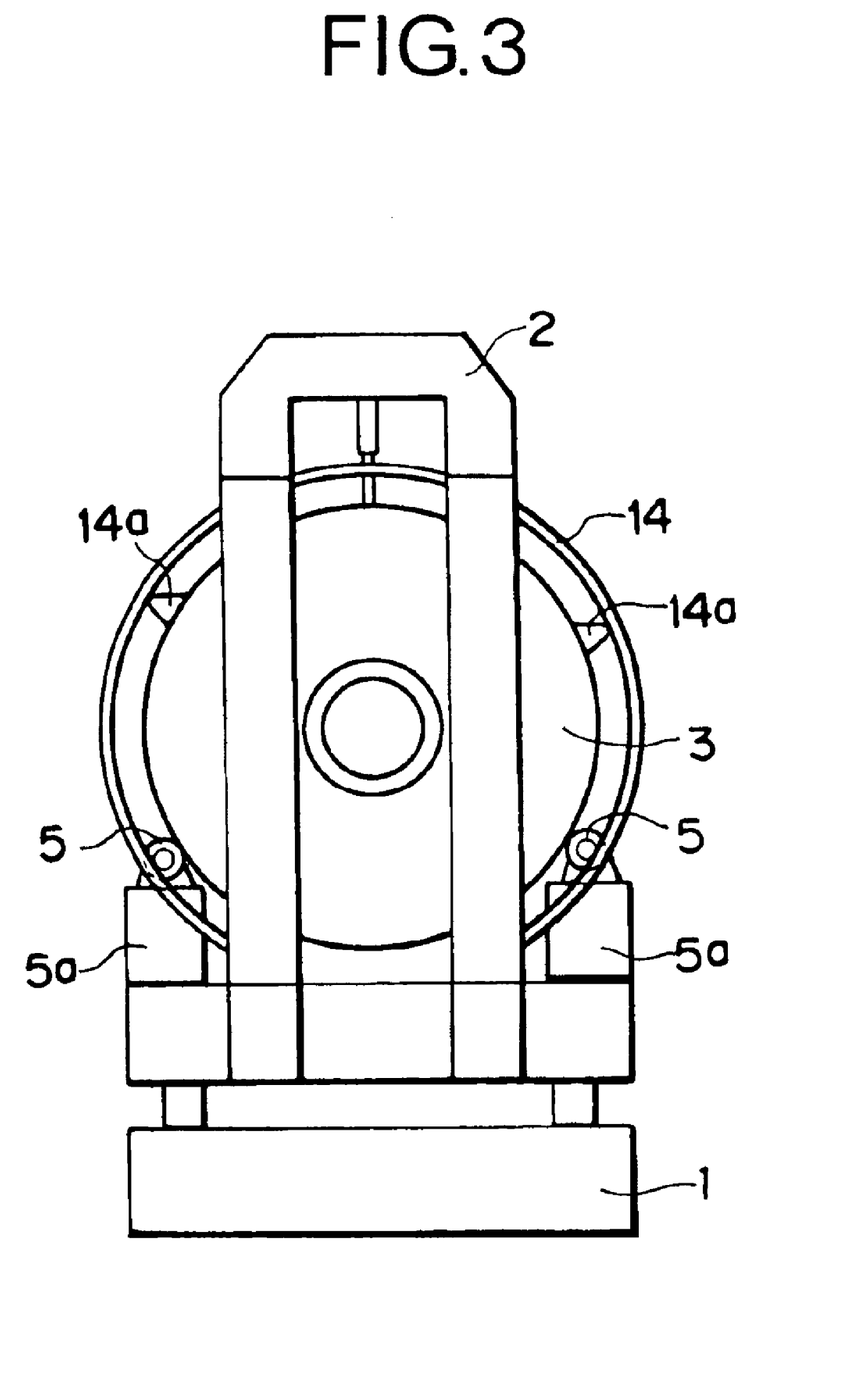
FIG. 3 is a side view of the thermal decomposition system.

On an outer wall of the rotary furnace 3 are centrally provided a plurality of conductor rings 13 for power supply, while on both end sides of the outer wall of the rotary furnace 3 are provided a plurality of conductor rings 14 for temperature measurement. As shown in FIG. 3, the conductor rings 14 are supported on a plurality of support bases 14a which are provided at appropriate intervals on the outer wall of the rotary furnace 3. In the thus-supported state the conductor rings 14 float from the outer wall of the rotary furnace 3. The conductor rings 13 are also supported in the same way as the conductor rings 14. Suspended from an upper portion of the frame 2 are contact pieces 15 and 16 which are respectively in contact with the conductor rings 13 and 14 constantly even when the rotary furnace 3 rotates.

Figure 2:
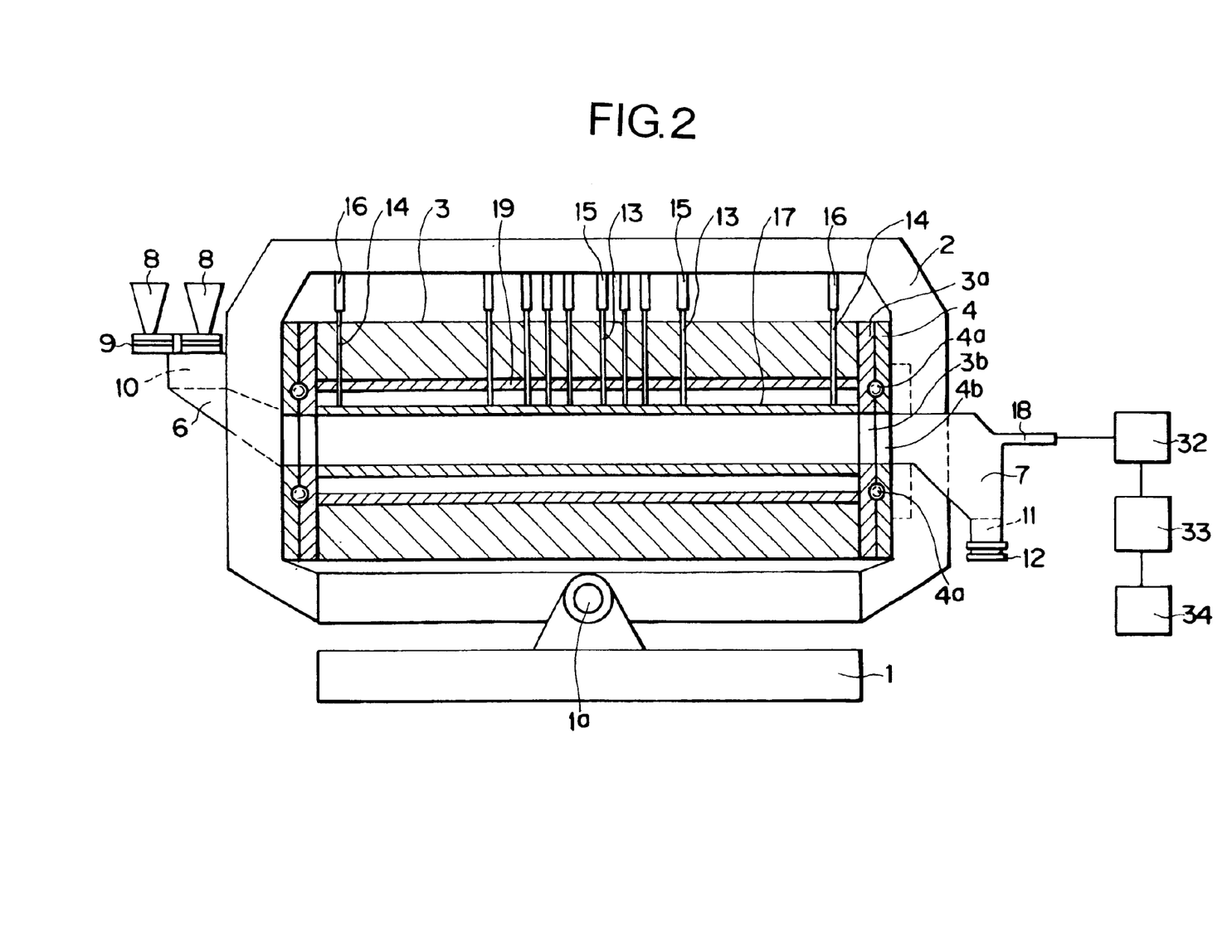
FIG. 2 is a sectional front view of a rotary furnace used in the embodiment.
Figure 5:
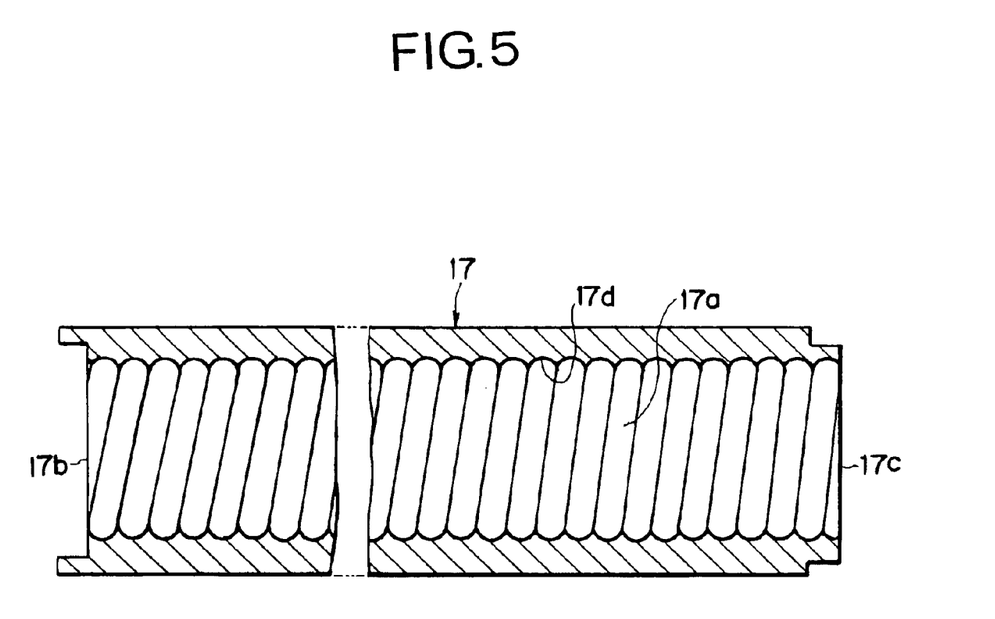
FIG. 5 is a sectional view of a crucible used in the embodiment.

As shown in FIG. 2, a cylindrical crucible 17 made of a material high in thermal conductivity and which material produces a far infrared ray is installed in the interior space of the cylindrical furnace 3. The crucible 17 is rotated together with the rotary furnace 3. A central axis of the cylindrical crucible 17 is aligned with a rotational central axis of the rotary furnace 3. As shown in FIG. 5, the cylindrical crucible 17 has a hollow portion 17a for receiving wastes to be treated therein, as well as an inlet 17b and an outlet 17c as openings formed at both ends of the crucible. In an inner wall of the hollow portion 17a is formed a spiral groove 17d. Both ends of the crucible 17 are supported by the rotary discs 3a. The inlet 17b of the hollow portion 17a is in communication with the feed box 6 through the through hole 3b of the rotary disc 3a located on the inlet 17b side and further through the through hole 4b of the stationary disc 4 located on the same side. On the other hand, the outlet 17c of the hollow portion 17a is in communication with the discharge box 7 through the through hole 3b of the rotary disc 3a located on the outlet 17c side and further through the through hole 4b of the stationary disc 4 located on the same side. A suction pipe 18 is provided in the discharge box 7, and to an end of the suction pipe 18 opposite to the discharge box 7 side is connected a suction device 32 for evacuating the interior of the hollow portion 17a of the crucible 17 and for the suction of gases issued during decomposition of the wastes. To the suction device 32 is connected a gas sorting/extracting device 33 for sorting and extracting the issued gases. Further, to the gas sorting/extracting device 33 is connected a heat treatment equipment 34 for heating a gas, if any, which has not selectively been extracted by the gas sorting/extracting device 33.

Figure 4:
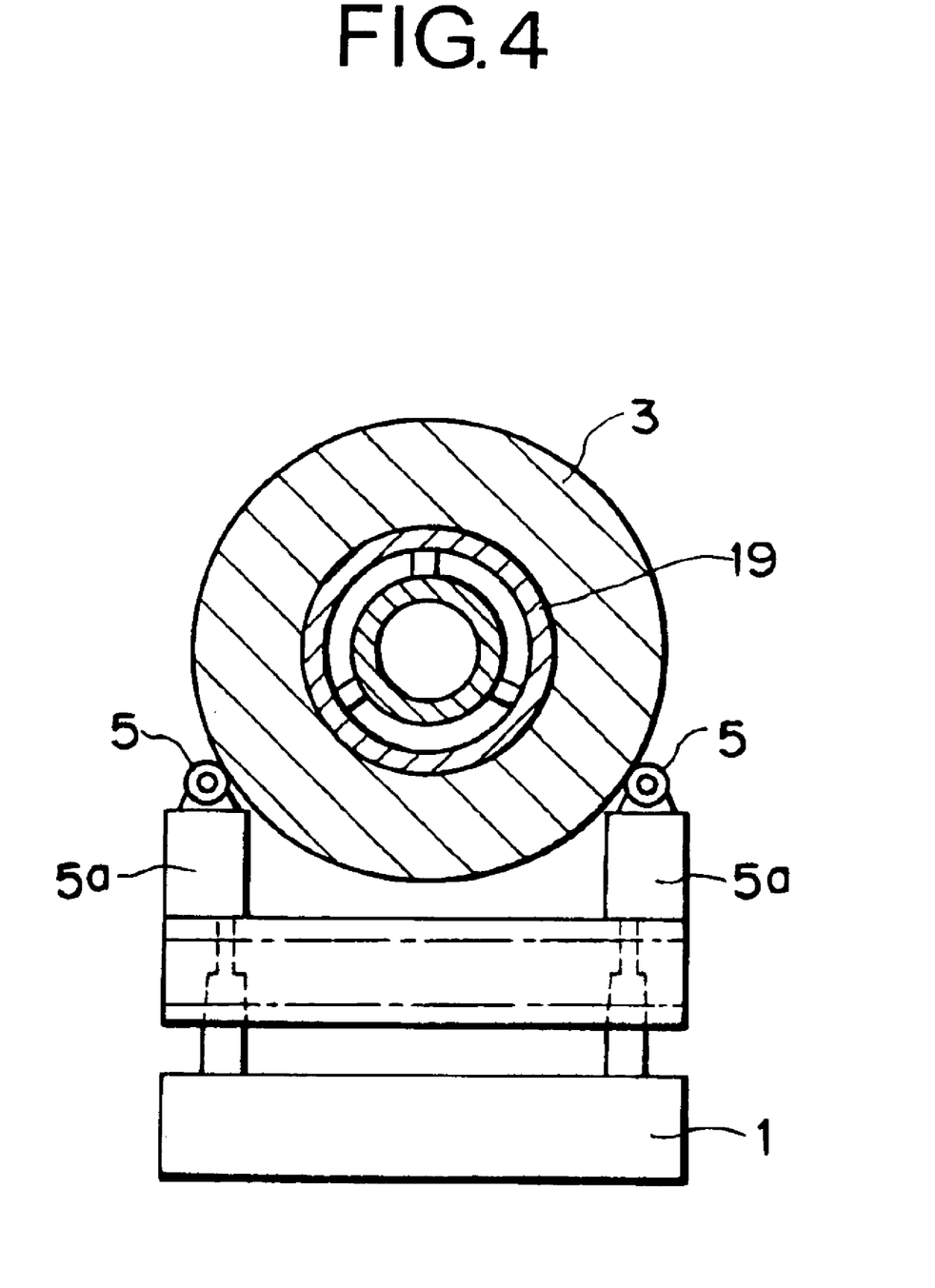
FIG. 4 is a sectional view of the rotary furnace with a frame removed.

In the interior of the rotary furnace 3 is installed a heating device 19 for heating the wastes introduced into the crucible 17. The heating device 19 is a far infrared radiation heating device capable of heating at a temperature in the range from room temperature to 1200° C. or higher. As shown in FIGS. 2 and 4, the heating device 19 is spaced from an outer wall of the crucible 17 and extends throughout the overall length from one end to the opposite end of the crucible. The heating device 19 is supplied with electric power from the conductor rings 13.

Figure 6:
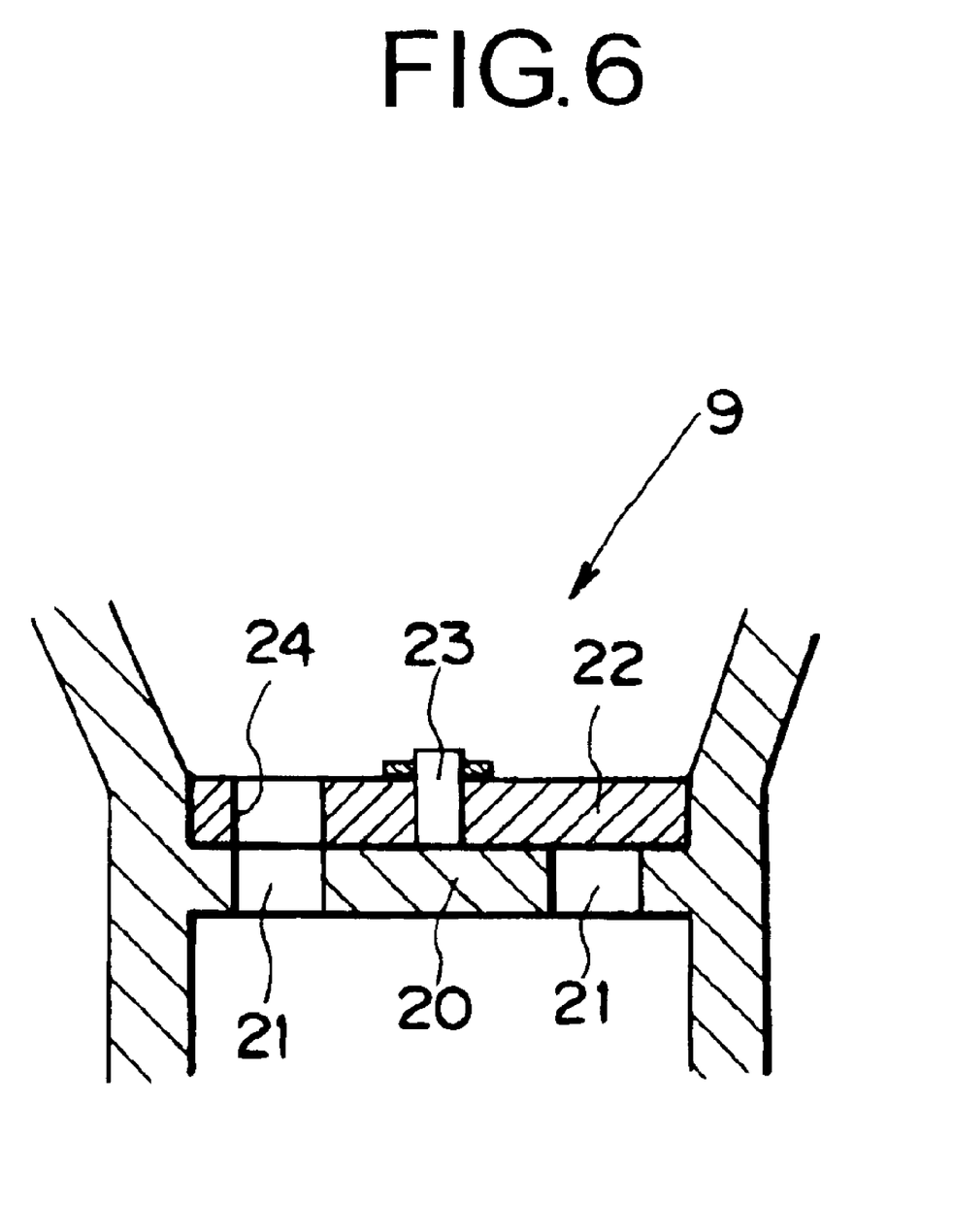
FIG. 6 is a sectional view of a rotary shutter used in the embodiment.
Figure 7:
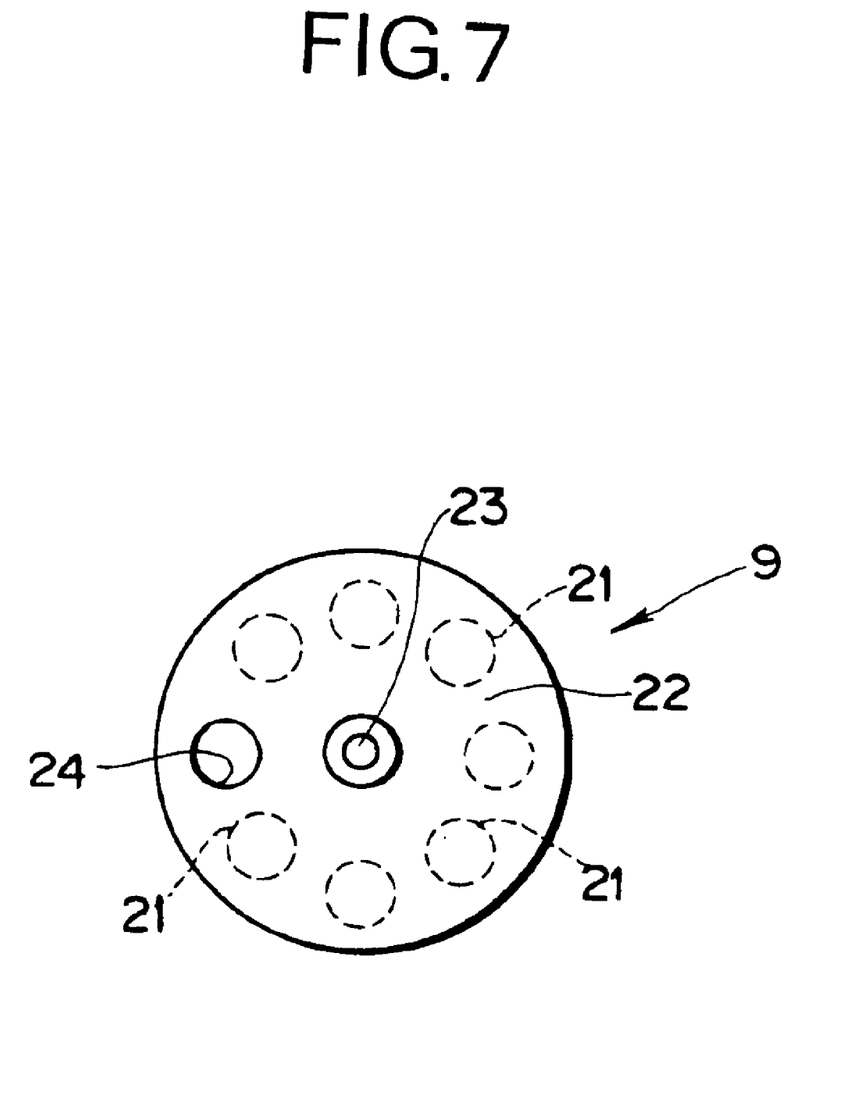
FIG. 7 is a plan view of the rotary shutter.

FIG. 6 is a sectional view showing the configuration of the rotary shutter 9 installed in the feed box 6 and FIG. 7 is a plan view thereof. The rotary shutter 9 is made up of a shielding disc 20 disposed in the upper portion of the feed box 6 and having a large number of through holes 21 formed concentrically on the shielding disc 20 and a rotary disc 22 superimposed on the shielding disc 20, the rotary disc 22 being rotatable about a shaft 23 and having a through hole 24. As the rotary disc 22 is rotated by drive means (not shown), the through hole 24 comes into registration with one of the through holes 22 intermittently, allowing the wastes to pass therethrough. The rotary shutter 12 in the discharge box 7 also has the same configuration as the rotary shutter 9.

Figure 8:
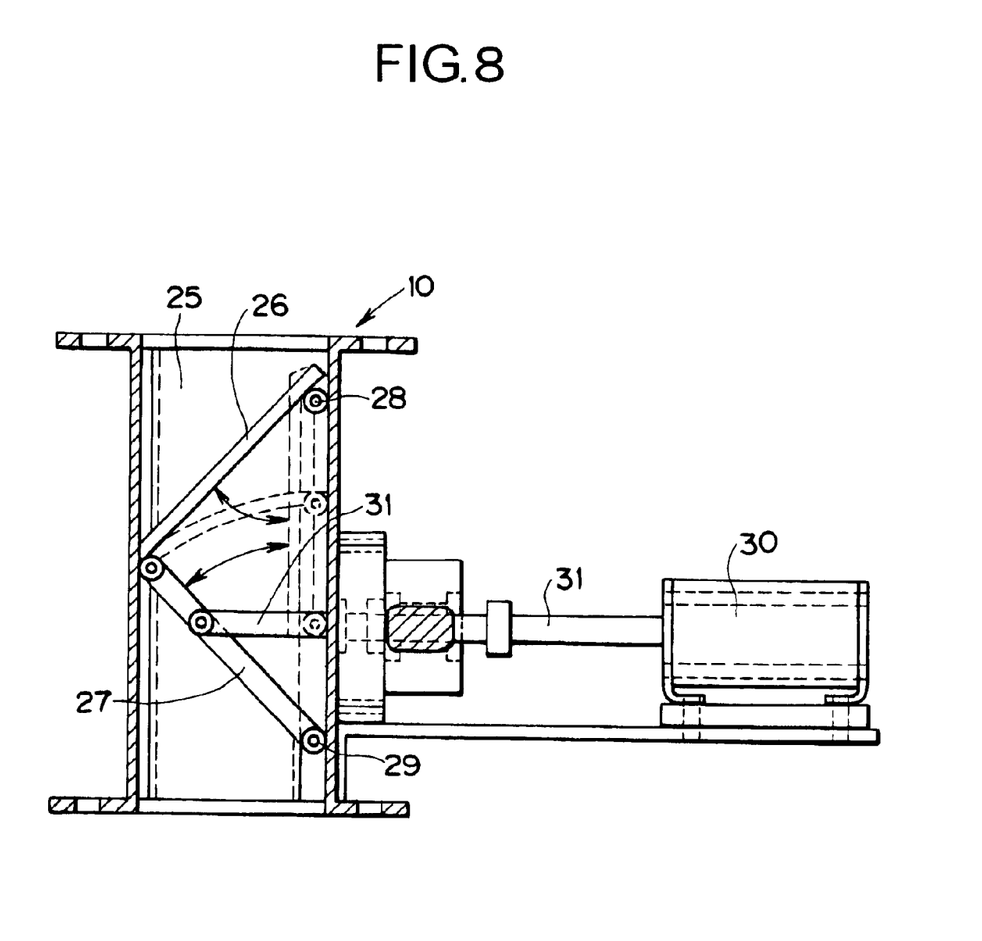
FIG. 8 is a front view of an auto-shutter used in the embodiment.

FIG. 8 illustrates the configuration of the auto-shutter 10 installed in the feed box 6. The auto-shutter 10 is composed of an upper shutter 26 located in an upper portion within a vertical passage 25 of a square section and a lower shutter 27 located in a lower portion of the passage 25. The upper shutter 26 is supported at an upper end thereof pivotably by a hinge 28 secured to an inner wall of the passage 25. When a free end of the upper shutter 26 on the side opposite to its hinged 28 side is raised, the passage 25 is closed, while when the free end is lowered, the passage 25 is opened. The lower shutter 27 is supported at a lower end thereof pivotably by a hinge 29 secured to the inner wall of the passage 25. When a free end of the lower shutter 27 is lowered, the free end of the upper shutter 26 is lifted, whereby the passage 25 is closed with both upper and lower shutters 26, 27. Therefore, if the free end of the lower shutter 27 is lifted into abutment against an inner wall of the passage located on the opposite side, i.e., the hinge side, the upper shutter 26 also lowers at its lower portion and is superimposed on the inside of the lower shutter 27, whereby the passage 25 is opened, allowing the wastes to drop. The lower shutter 27 is connected to a piston 31 of a cylinder 30 disposed outside the passage 25 and is interlocked with motions of the piston 31. Also as to the auto-shutter 11 disposed in the discharge box 7, it has the same configuration as the auto-shutter 10.

The wastes when introduced into the feed hoppers 8 are conveyed to the feed box 6 continuously by the rotary shutter 9. When the wastes accumulate within the feed box 6, the auto-shutter 10 opens, so that the wastes enter the hollow portion 17a of the crucible 17 installed centrally of the rotary furnace 3. Thereafter, the rotary shutter 9 and the auto-shutter 10 are closed and the suction device 32 is operated to evacuate the interior of the crucible 17. Then, the heating device 19 is operated to heat the crucible 17 to about 1200° C. and the rollers 5 are actuated by the drive units 5a to rotate the rotary furnace 3, whereby the wastes present within the crucible 17 are heated and decomposed with an ultra-high heat energy of an electromagnetic wave (far infrared radiation) in vacuum. As a result, the wastes in the crucible 17 move, while being thermally decomposed, from the inlet 17b side to the outlet 17c side of the crucible 17 along the spiral groove 17d formed in the inner periphery of the crucible which is rotating. At the same time, gases produced by the thermal decomposition are withdrawn from the interior of the crucible by the suction pipe 18. Therefore, the interior of the crucible 17 is held in vacuum by suction with the suction pipe 18.

The gases sucked by the suction device 32 reach the gas sorting/extracting device 33, in which the gases are sorted and extracted. The gases thus extracted are, for example, liquefied for disposal or re-utilized. A gas, if any, which has not been extracted by the gas sorting/extracting device 33 enters the heat treatment equipment 34, in which a portion of the gas is decomposed at a high temperature and the other portion is made harmless through a clean filter (not shown) and is then released to the exterior.

The wastes present within the crucible 17 reach the outlet 17c along the spiral groove 17d while being thermally decomposed. By being heated for a certain time, the wastes are decomposed into ash, which ash is then introduced into the discharge box 7. The auto-shutter 11 is opened, allowing the ash thus introduced into the discharge box 7 to drop, and is then closed once. Thereafter, the rotary shutter 12 is opened to discharge the ash to the exterior from the discharge box 7. Thus, the ash is discharged to the exterior by opening and closing the double shutter structure in the discharge box 7. The ash thus discharged can be re-utilized as a product such as a ceramic product by cooling it into a solid matter with use of a suitable method.

Thus, the wastes to be treated are introduced into the crucible 17 by intermittent opening and closing of the auto-shutter 10 and are discharged from the discharge box 7 by intermittent opening and closing of the auto-shutter 11. At this time, the interior of the crucible 17 is opened temporarily by the auto-shutter 10 in the feed box 6 and the auto-shutter 11 in the discharge box 7, but except this time the auto-shutters 10 and 11 are closed to seal the interior of the crucible 17 hermetically and the crucible interior is made vacuous by the suction device 32.

The retention time of the wastes in the crucible 17 is about 20 to 40 minutes and 3 to 10 kg of wastes per minute can be treated. In this way wastes are introduced into the crucible 17 intermittently and ash is discharged from the discharge box 7 also intermittently. Thus, the wastes are thermally decomposed intermittently but in a continuous manner.

Figure 1:
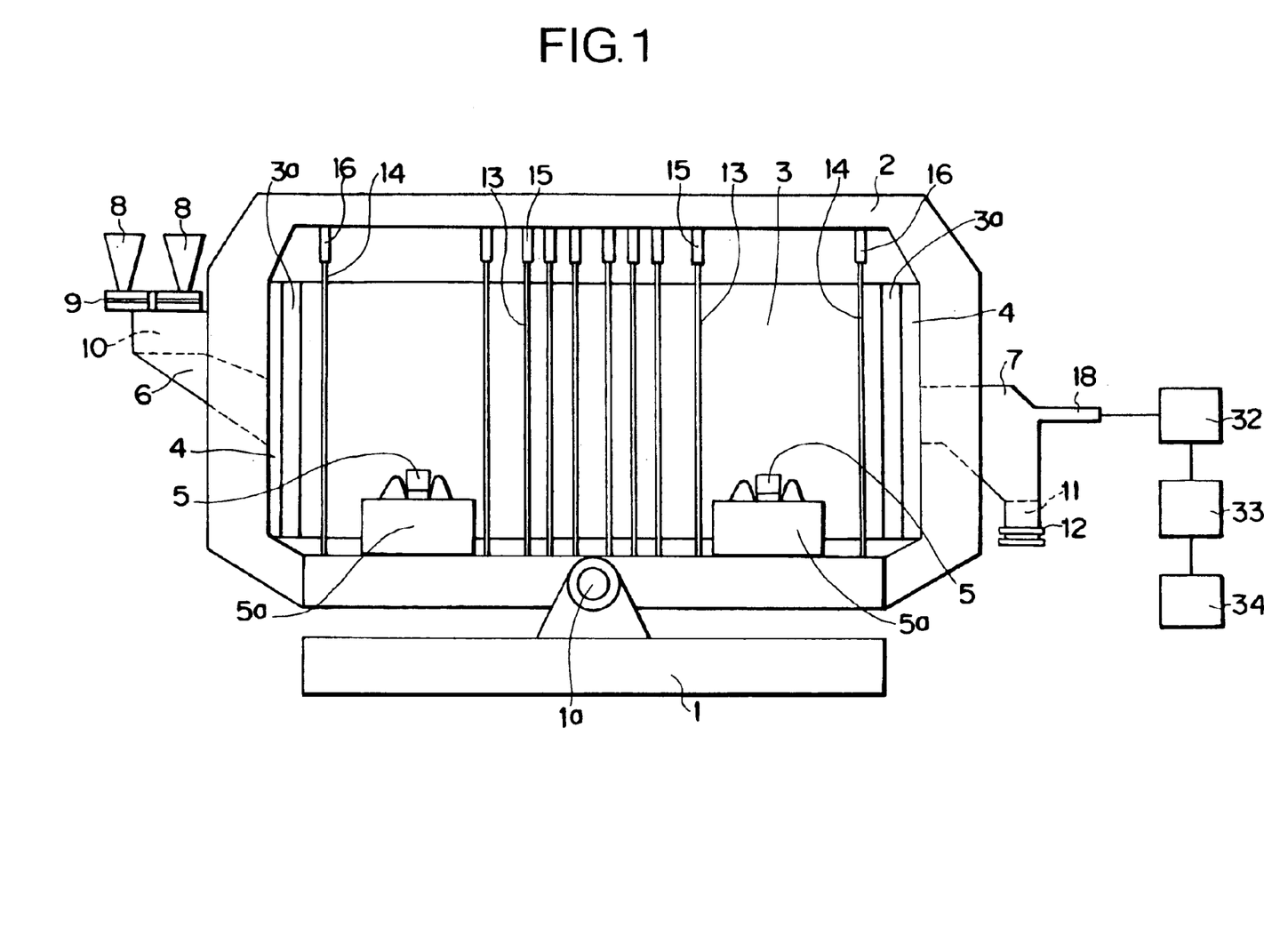
FIG. 1 is a front view of an intermittent flow type thermal decomposition system according to an embodiment of the present invention.
Figure 9:
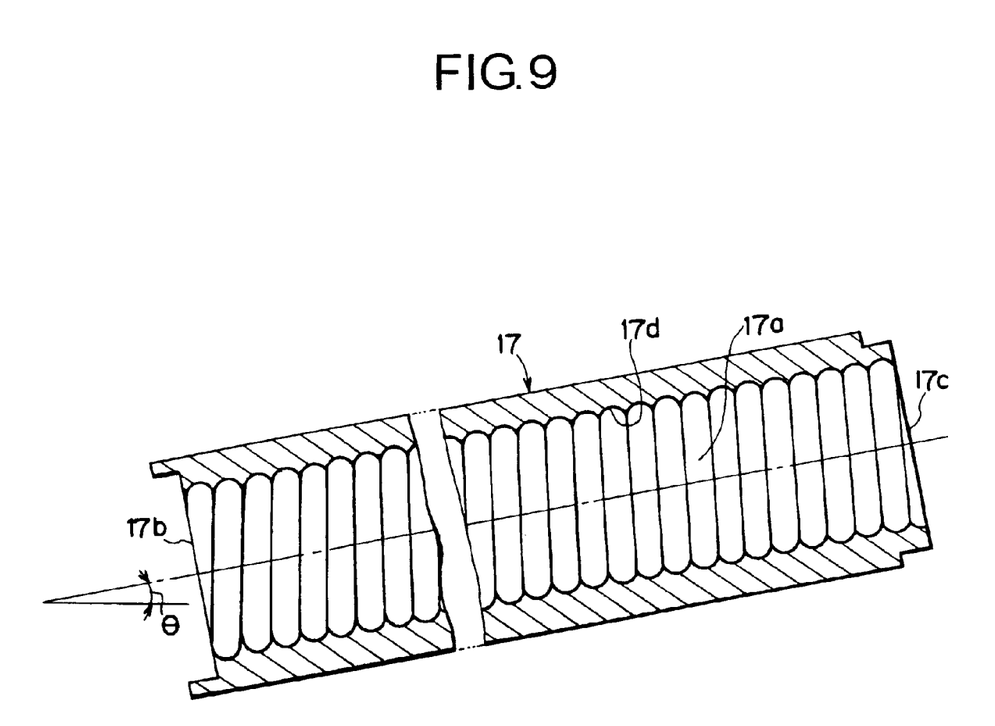
FIG. 9 is a sectional view of a crucible used in another embodiment of the present invention.

In FIGS. 1 and 2 the crucible 17 is in a horizontal state, while FIG. 9 illustrates a tilted state of the crucible 17 (rotary furnace 3). In FIG. 9, the outlet 17c of the crucible 17 is relatively higher than the inlet 17b of the crucible (a tilt angle relative to the horizontal plane is set at θ). The reverse may also be adopted in the invention. As shown in FIG. 9, the crucible 17 is tilted so that the wastes present therein rise as they move within the crucible. This is advantageous in that the thermally decomposed ash can be raised to a high position, e.g., a drying position, automatically. Heretofore, a lift has been required for lifting the ash up to a high position for drying, but by tilting the crucible 17 (rotary furnace 3) the use of such a lift is not required. With the crucible 17 (rotary furnace 3) tilted, the amount (decomposition volume) of wastes advancing through the interior of the crucible 17 can be adjusted by changing the rotational speed of the roller 5 rotated by the drive units 5a. Even without causing the crucible 17 (rotary furnace 3) to tilt, a proper thermal decomposition can be done if the rotational speed of the rollers 5 is changed by the drive units 5a according to the type of wastes to be treated.

According to the present invention, as set forth above, since the interior of the crucible which is held in vacuum is heated to about 120° C. to decompose wastes thermally, dioxin, etc. can be decomposed. Since the wastes which have entered the crucible are conveyed from the inlet side to the outlet side of the crucible successively along the spiral groove in the crucible with rotation of the rotary furnace, the wastes can be decomposed thermally while being passed intermittently through the crucible. Thus, in comparison with the conventional batch process involving repetition of wastes feed into the crucible, a large volume of wastes can be subjected to a thermal decomposition treatment continuously and hence it is possible to enhance the working efficiency.

Gases sucked out from the crucible are sorted and extracted by the gas sorting/extracting device and extracted gases are collected. Even if there is any gas not extracted by the gas sorting/extracting device, the gas is introduced into the heat treatment equipment connected to the gas sorting/extracting device and is thermally decomposed therein, whereby the release of harmful gas and offensive smell to the exterior is prevented.

Moreover, by tilting the crucible so that the wastes present therein rise as they move through the interior of the crucible, ash resulting from thermal decomposition can be conveyed automatically to a high position for drying, thus making it possible to omit the use of a lift for lifting such ash to a high drying position. Further, the decomposition volume of wastes advancing through the interior of the crucible can be adjusted by changing the rotational speed of the crucible with use of drive units. Ash resulting from thermal decomposition of the wastes is solidified and can be re-utilized thereby. Additionally, since the thermal decomposition of wastes is performed under rotation of the rotary furnace, the wastes can be decomposed uniformly. By providing pantograph-like conductor rings on the outer wall of the rotary furnace, electric power can be supplied from the frame to the interior of the rotary furnace stably even during rotation of the same furnace.

What is claimed is:

1. An intermittent flow type thermal decomposition system for thermally decomposing wastes, comprising:
    a crucible for thermally decomposing the wastes in a vacuum, said crucible having a cylindrical shape, and an inlet and an outlet at opposing ends thereof, and an interior having a spiral groove formed in an inner wall thereof;
    a frame;
    a rotary furnace held rotatably by said frame, with an interior and said crucible being installed in the interior of said rotary furnace;
    a heating device disposed inside said rotary furnace and outside said crucible;
    a drive unit for rotating said rotary furnace;
    a feed box for receiving said wastes and for introducing the received wastes into said crucible, said feed box communicating with said inlet of said crucible and supported by said frame;
    a discharge box communicating with said outlet of said crucible and supported by said frame;
    a first shutter device installed in said feed box for hermetically sealing said interior of said crucible from the exterior in a closed position and for, in an open position, allowing wastes from the feed box to enter the interior of said crucible;
    a second shutter device installed in said discharge box for hermetically sealing said interior of said crucible from the exterior in a closed position and for, in an open position, discharging the thermally decomposed wastes from the discharge box; and
    a suction device connected with said discharge box for evacuating the interior of said crucible to form the vacuum in said crucible and for discharging gases from the interior of said crucible by suction, said gases being produced when the wastes are decomposed by said heating device.

2. An intermittent flow type thermal decomposition system according to claim 1, wherein a gas sorting/extracting device is connected to said suction device to sort and extract gases produced during decomposition of the wastes.

3. An intermittent flow type thermal decomposition system according to claim 2, further comprising a heat treatment device connected to said gas sorting/extracting device and a gas, if any, not extracted by said gas sorting/extracting device out of the gases produced during decomposition of the wastes, is introduced into said heat treatment device connected to the gas sorting/extracting device and is heated therein.

4. An intermittent flow type thermal decomposition system according to claim 1, wherein said outlet of said crucible is positioned higher than said inlet of said crucible.

5. An intermittent flow type thermal decomposition system according to claim 1, wherein said frame is mounted onto a base in a swingable relation to each other so that a tilt angle of the frame relative to said base can be changed freely.

6. An intermittent flow type thermal decomposition system according to claim 1, wherein said shutter devices for shutting off said feed box and said discharge box, and the exterior of said crucible from each other have each a double shut-off structure.

7. An intermittent flow type thermal decomposition system according to claim 1, wherein said heating device disposed inside said rotary furnace and outside said crucible is a far infrared radiation heating device capable of heating the wastes present within said crucible to a temperature of 1200° C. or higher.

8. An intermittent flow type thermal decomposition system according to claim 1, wherein a ring-shaped conductor is provided on an outer periphery of said rotary furnace, said ring-shaped conductor and said heating device disposed inside said rotary furnace and outside said crucible are connected with each other electrically, and further comprising a contact piece provided in said frame and adapted to contact said ring-shaped conductor constantly during rotation of said rotary furnace.

9. An intermittent flow type thermal decomposition system according to claim 1, further comprising at least one hopper for feeding wastes to be thermally decomposed into said feed box and a third shutter device interposed between said at least one hopper and said feed box for controlling flow of wastes from said at least one hopper into the feed box.

10. An intermittent flow type thermal decomposition system according to claim 9, wherein said third shutter device is a rotary shutter comprising a plate member having a plurality of through holes circumferentially arranged therein and a disk having a single through hole which comes into register with each of the plurality of through holes in the plate member, in succession, with relative rotation between the disk and the plate member.

11. An intermittent flow-type thermal decomposition system according to claim 1 wherein at least one of said first and second shutter devices comprises:
    a vertically oriented housing defining a vertical passage therethrough;
    a first shutter, extending downward from a pivotal connection to said housing within said flow passage, for pivoting motion between an upper position closing said vertical passage and a lower position opening said vertical passage;

a second shutter extending upward from a pivotal connection to said housing at a point vertically beneath the pivotal connection of said first shutter, said second shutter having a free end bearing against a lower surface of said first shutter so that pivoting movement of said second shutter outward raises said first shutter toward said closed position and pivoting movement of said second shutter inward allows said first shutter to pivot downward to open said vertical passage; and drive means for driving said lower shutter with said inward and outward pivoting movement.

12. An intermittent flow type thermal decomposition system according to claim 1, wherein said crucible is coaxial with and rotates with said rotary furnace.

13. An intermittent flow type thermal decomposition system according to claim 12, wherein said crucible has an outer cylindrical surface separated from an inner cylindrical surface of said rotary furnace to define an annular space therebetween.

14. An intermittent flow type thermal decomposition system according to claim 13 wherein said heating device surrounds and is spaced from the outer cylindrical surface of said crucible, said heating device rotating with said rotary furnace.

15. An intermittent flow type thermal decomposition system according to claim 14 wherein said heating device is a far infrared radiation heating device.

16. An intermittent flow type thermal decomposition system according to claim 15 wherein said heating device extends throughout the overall length of said crucible.

17. An intermittent flow type thermal decomposition system according to claim 1 wherein said heating device surrounds and is spaced from an outer cylindrical surface of said crucible, said heating device rotating with said rotary furnace.

18. An intermittent flow type thermal decomposition system according to claim 17 wherein said heating device surrounds and is spaced from an outer cylindrical surface of said crucible, said heating device rotating with said rotary furnace.

* * * * *